C. O. WACHTER.
MACHINE FOR WRAPPING ARTICLES.
APPLICATION FILED OCT. 14, 1919.

1,394,240.

Patented Oct. 18, 1921.
8 SHEETS—SHEET 1.

Inventors
C. O. Wachter,
By Henry T. Bright
Attorney

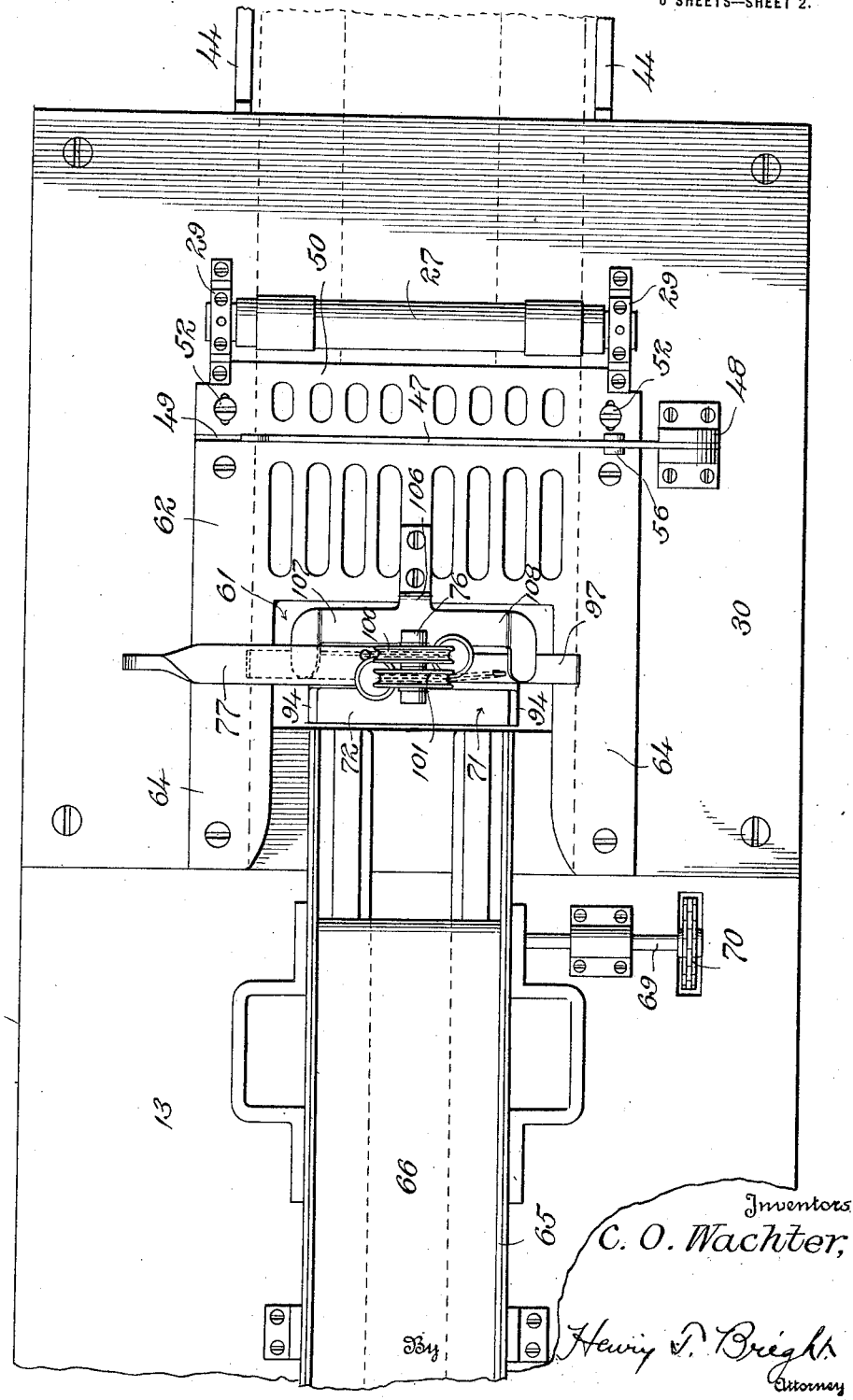

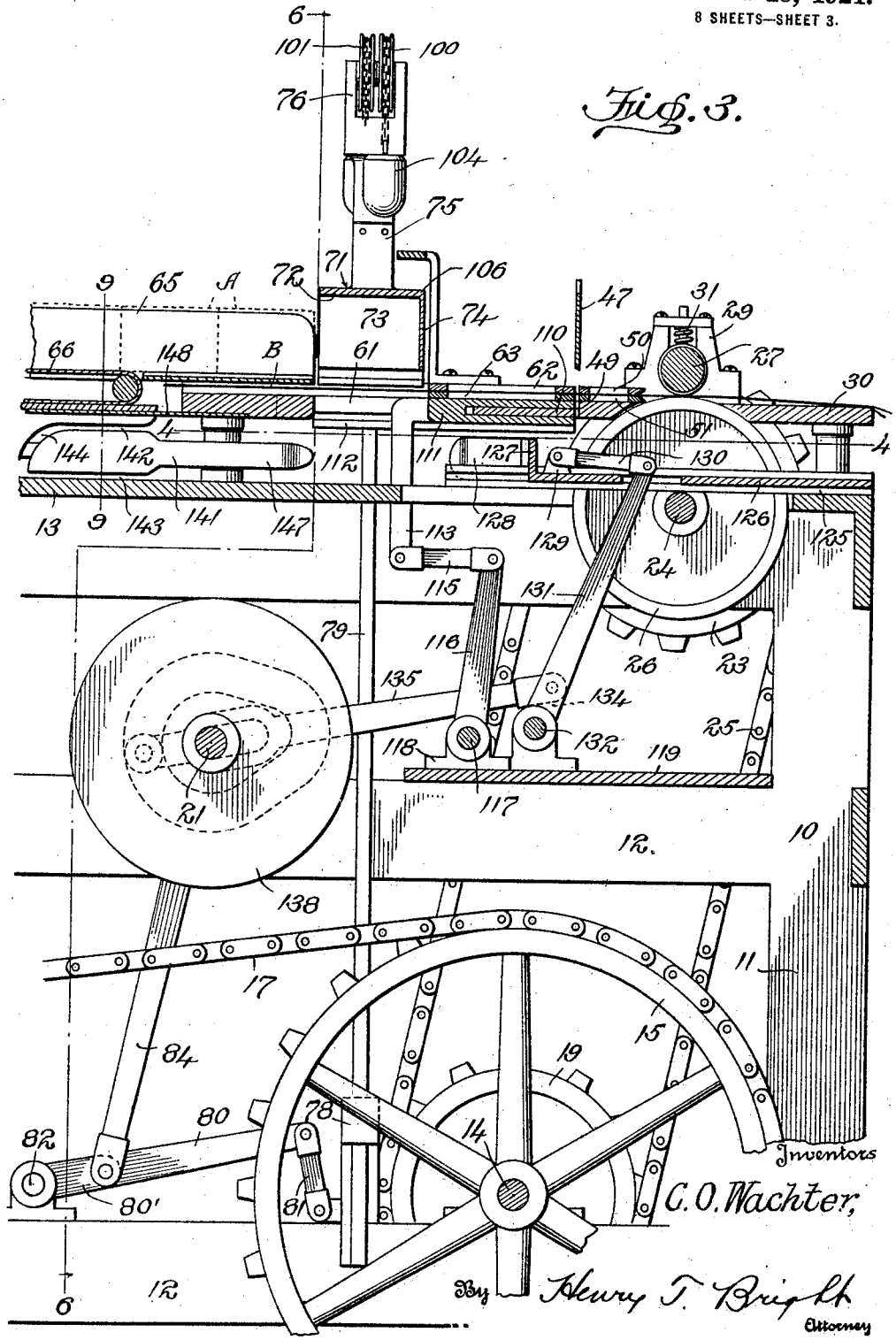

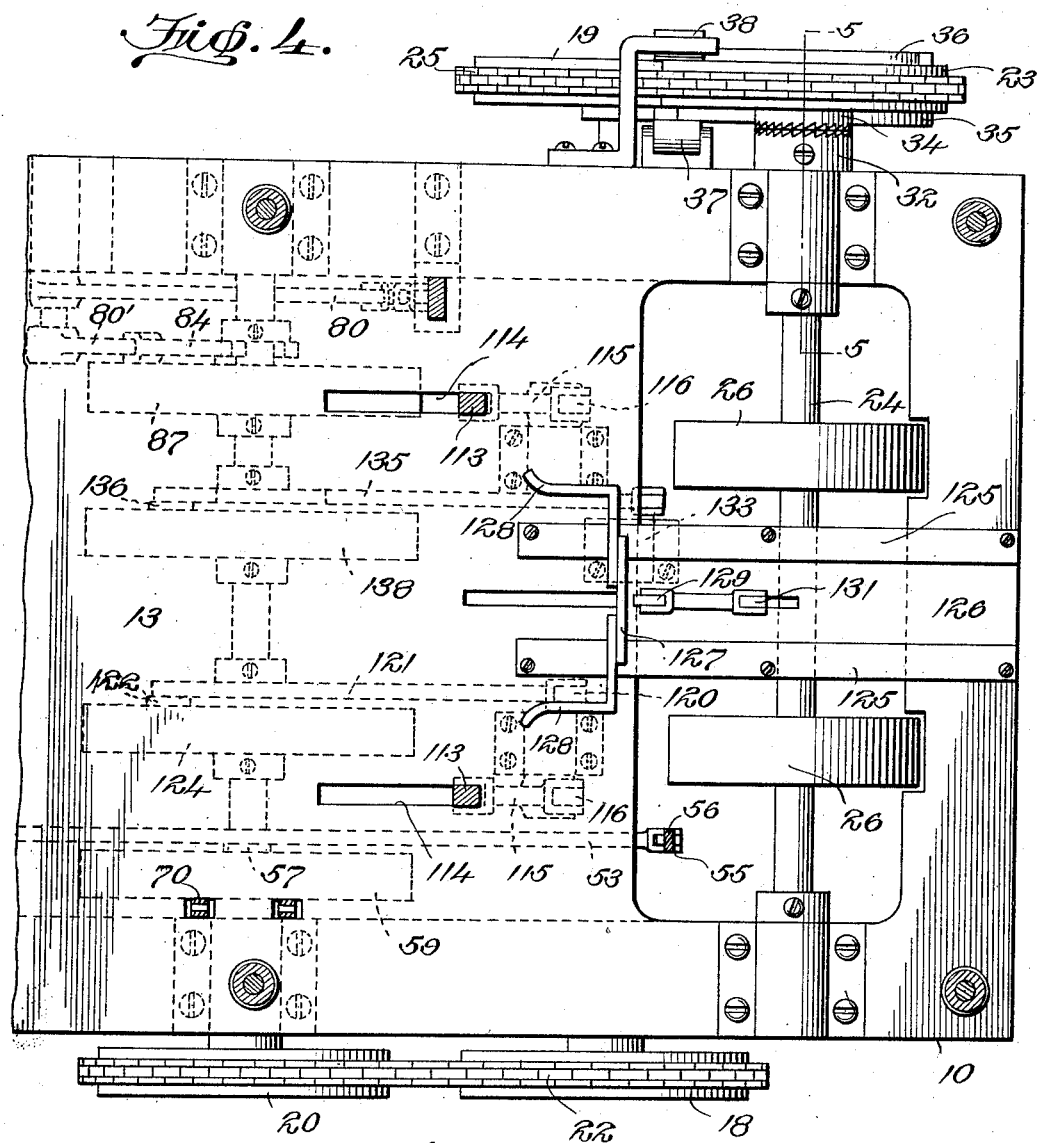

C. O. WACHTER.
MACHINE FOR WRAPPING ARTICLES.
APPLICATION FILED OCT. 14, 1919.

1,394,240.

Patented Oct. 18, 1921.
8 SHEETS—SHEET 5.

Inventor
C. O. Wachter;
By Henry T. Bright
Attorney

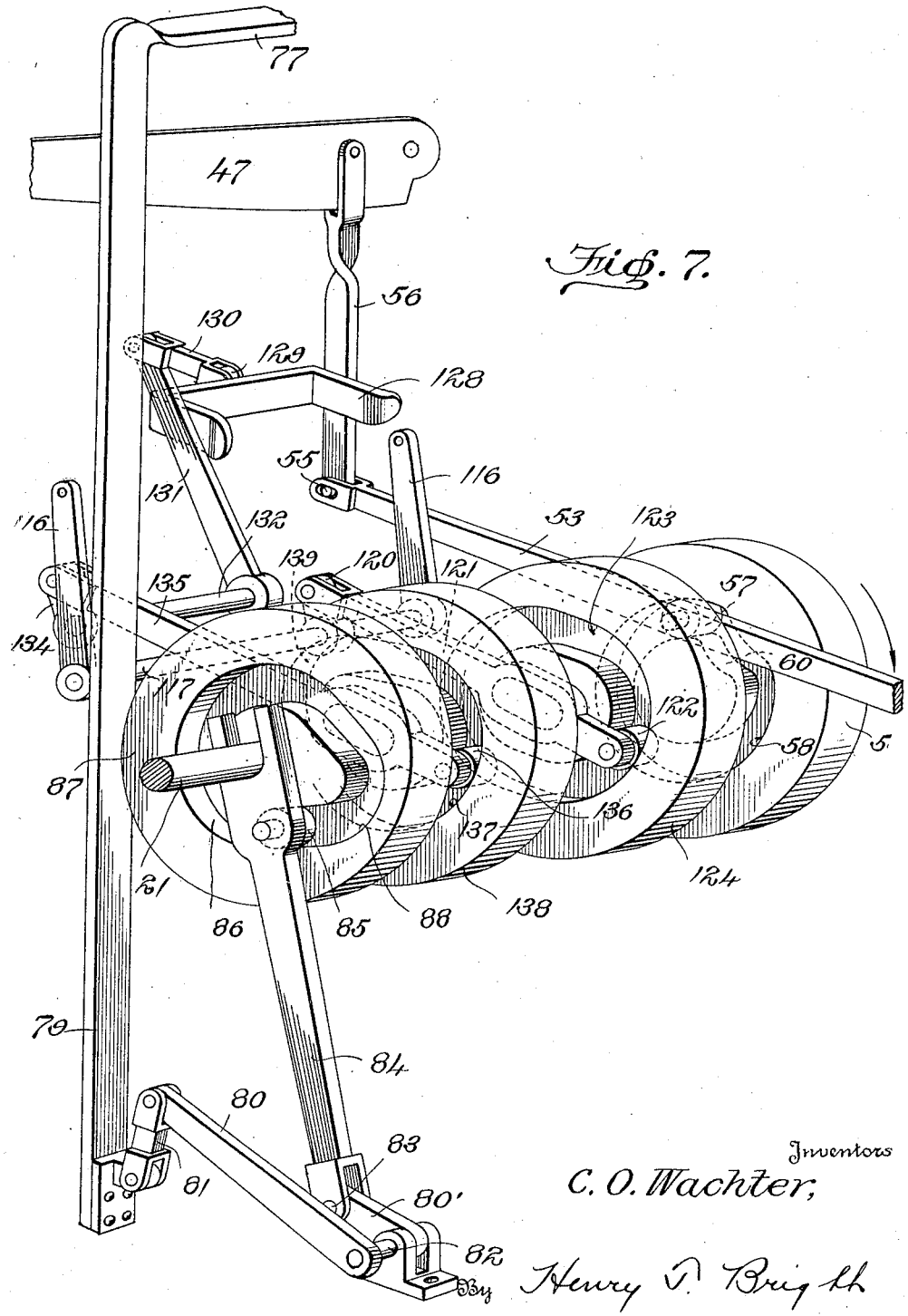

C. O. WACHTER.
MACHINE FOR WRAPPING ARTICLES.
APPLICATION FILED OCT. 14, 1919.
1,394,240.
Patented Oct. 18, 1921.
8 SHEETS—SHEET 7.
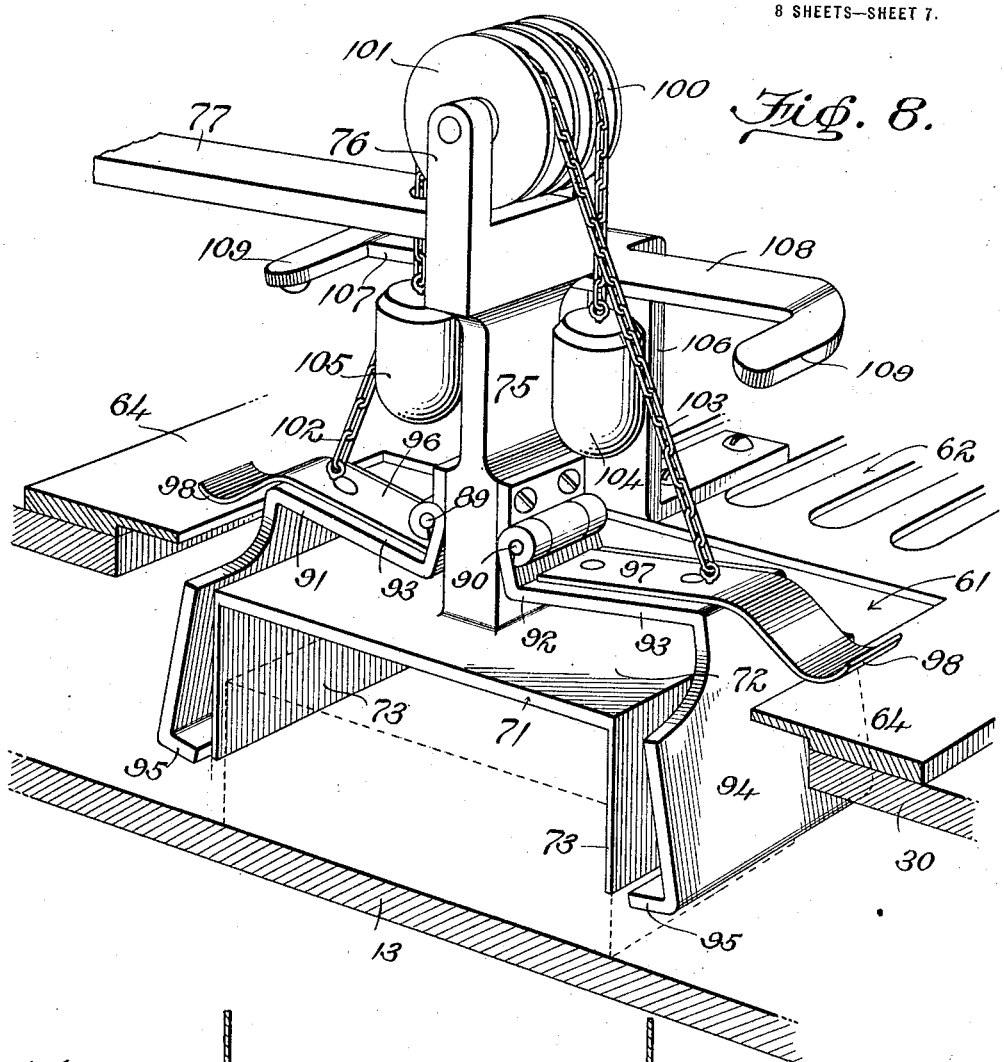
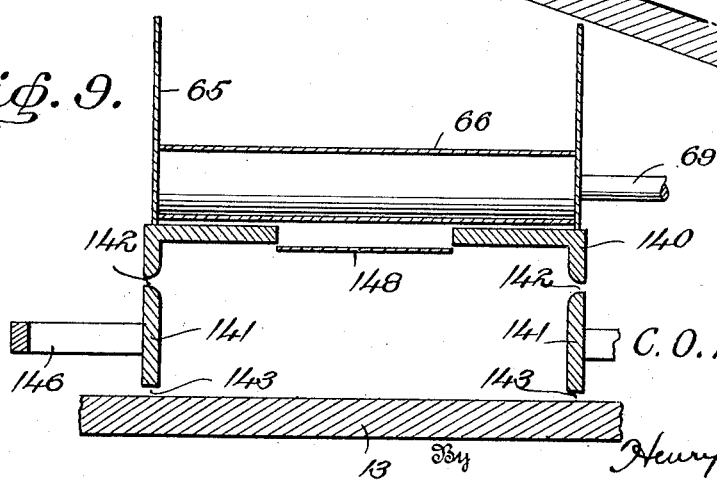
Inventors
C. O. Wachter,
By Henry T. Bright
Attorney C. O. WACHTER.
MACHINE FOR WRAPPING ARTICLES.
APPLICATION FILED OCT. 14, 1919.
1,394,240.
Patented Oct. 18, 1921.
8 SHEETS—SHEET 8.
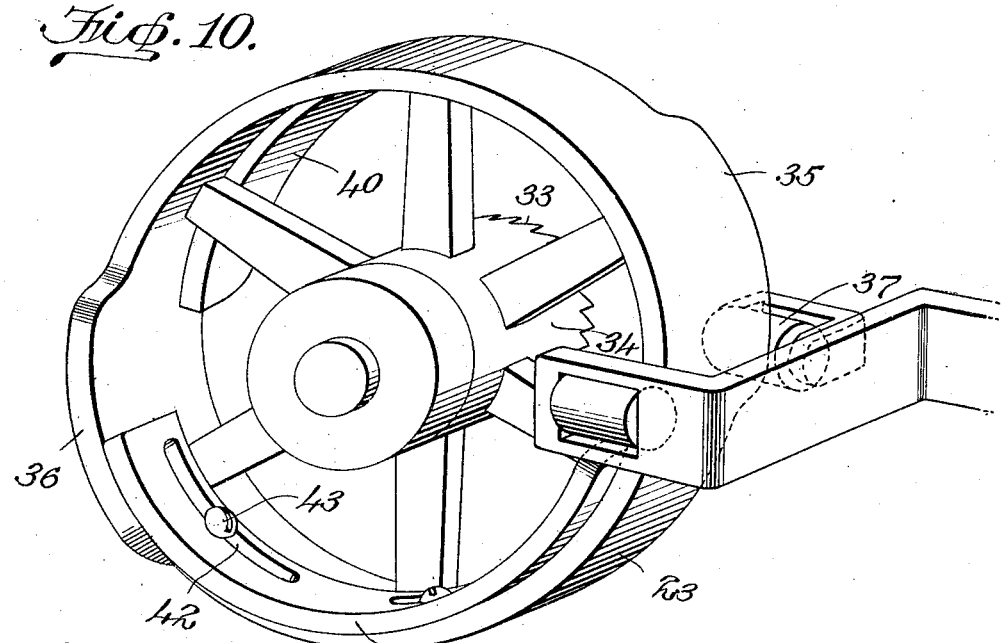
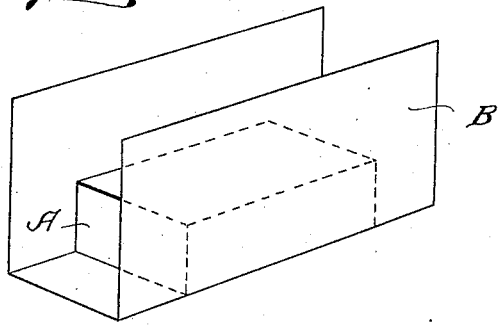
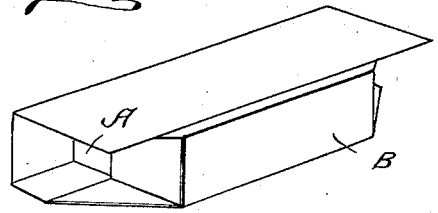
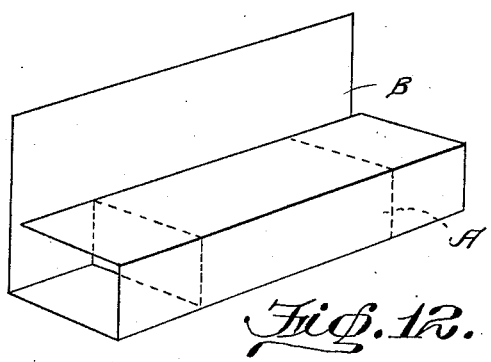
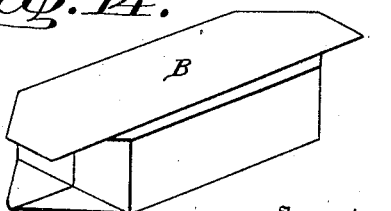
Inventors
C. O. Wachter,
By Henry T. Bright
Attorney

UNITED STATES PATENT OFFICE.

CARL O. WACHTER, OF WHEELING, WEST VIRGINIA.

MACHINE FOR WRAPPING ARTICLES.

1,394,240.

Specification of Letters Patent.  Patented Oct. 18, 1921.

Application filed October 14, 1919. Serial No. 330,627.

*To all whom it may concern:*

Be it known that I, CARL O. WACHTER, citizen of the United States, residing at Wheeling, in the county of Ohio, State of West Virginia, have invented certain new and useful Improvements in Machines for Wrapping Articles, of which the following is a specification.

My invention relates to machines for wrapping articles and aims to eliminate certain important disadvantages present in accepted types of wrapping machines now in general use, the more important of which are complicated structure; machine elements such as springs and the like which are non-positive in operation; restricted capacity of output, and the difficulties encountered in wrapping soft articles.

To overcome these and other disadvantages I have devised a machine having various novel details of construction, combinations and arrangements of parts which will be more fully described hereinafter and then defined in the appended claims.

The best form of the invention known to me at present is illustrated in the accompanying drawings, but it is to be understood that the machine as herein disclosed is susceptible to improvements without departing from the spirit of the invention.

In the drawings:—

Fig. 2, is a top plan view;

Figure 1:
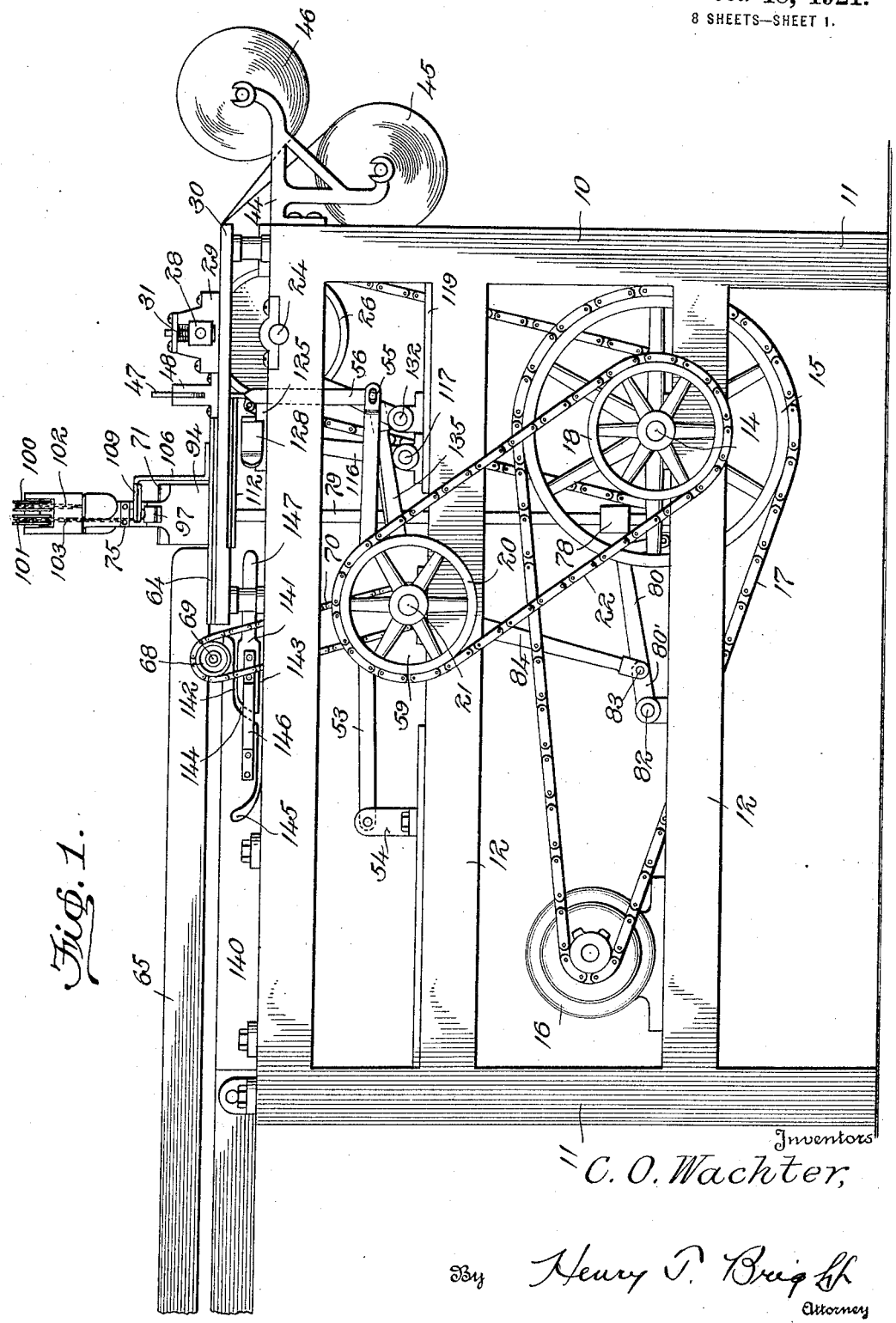
Figure 1 is a side elevation of the machine.
Figure 6:
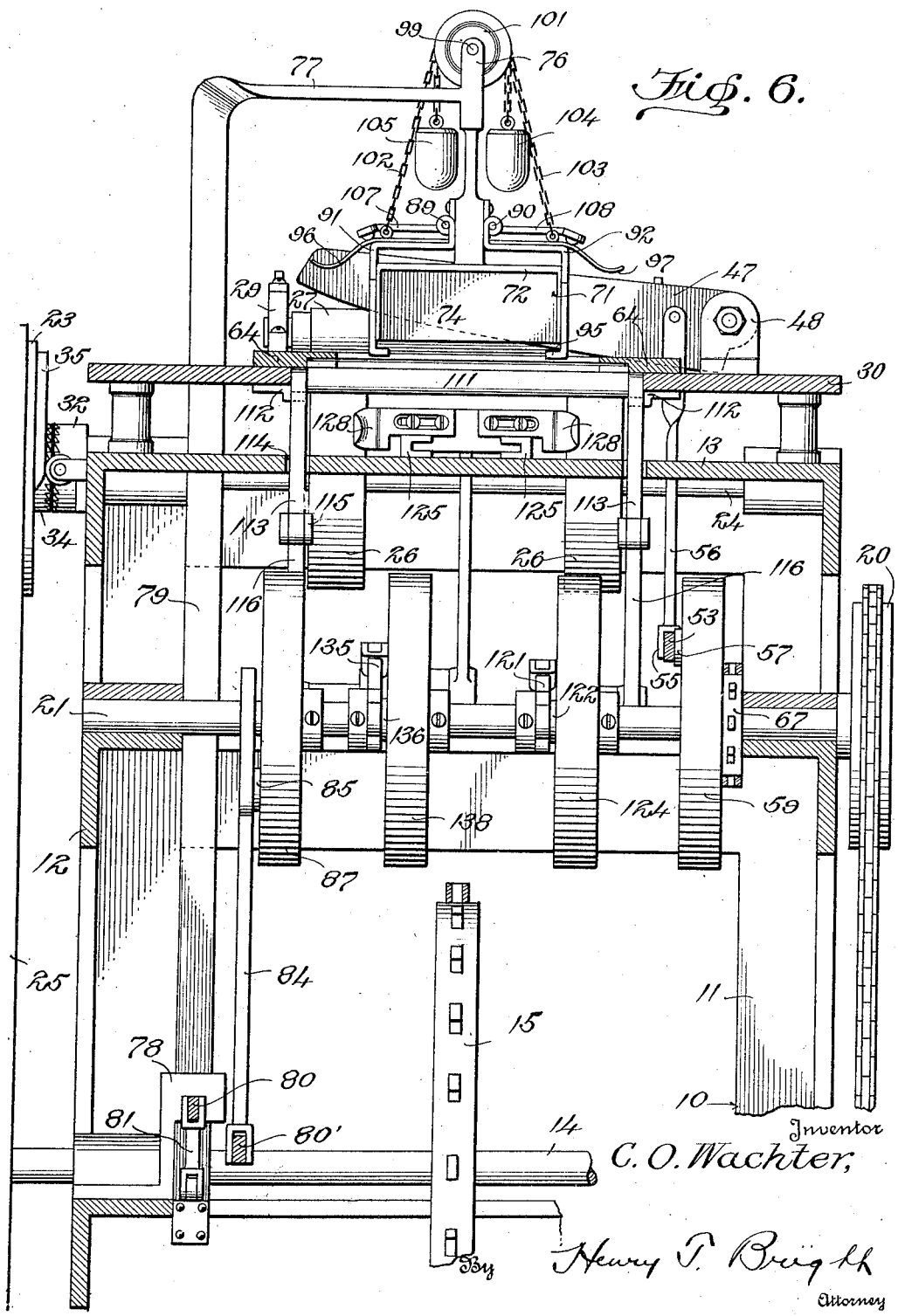

Fig. 3, a central vertical longitudinal section of a portion of the machine;

Fig. 4, a horizontal section on the line 4—4 of Fig. 3;

Fig. 5, a detail section on the line 5—5 of Fig. 4;

Fig. 6, a transverse section on the line 6—6 of Fig. 3;

Fig. 7, is a perspective showing the relative arrangement of the operating cams and their associated parts;

Fig. 8, a perspective of the plunger showing the same in its lowered position;

Fig. 9, a section on the line 9—9 of Fig. 3;

Fig. 10, a perspective illustrating the means for operating the paper rolls; and Figs. 11, 12, 13 and 14, perspectives showing the steps of operation of the machine upon an article as it is wrapped.

Referring now to the drawings by characters of reference 10 designates generally a rectangular frame, formed from any suitable material and including the standards or legs 11 connected by braces 12, and a top plate 13.

Journaled in bearings carried by the lower longitudinal braces 12 is a main drive shaft 14 which extends transversely of the frame and has fixed thereto a large sprocket wheel 15 which is connected with any suitable source of power, such as an electric motor 16, by a drive chain 17. The shaft 14 also has fixed thereon two sprocket wheels 18 and 19, the former of which is connected in driving relation with a sprocket wheel 20 fixed on a shaft 21 by means of a chain 22, while the latter is similarly connected with a sprocket wheel 23, loosely mounted for free rotation and relative sliding movement on a shaft 24 by means of a chain 25.

The shaft 24 extends transversely across the top of the frame near one end thereof and has fixed thereon the spaced feed wheels 26 which coöperate with a roller 27 which has its spindle ends mounted in bearings 28 slidably arranged in bearing blocks 29 carried by a supplementary top plate 30 rigidly supported in spaced relation above the top plate 13. Springs 31 serve to force the bearings 28 in the direction of the shaft 24 and maintain the roller 27 normally in contact with the feed wheels 25, said wheels extending through openings in the top plate, as illustrated to best advantage in Fig. 3 of the drawings.

Intermittent rotation of the feed wheels 25 is desired and in order to accomplish this I fix to the shaft 24 a collar or clutch member 32 having a toothed face 32' for engagement with a similar toothed face 33 upon the hub 34 of the sprocket wheel 23. The sprocket wheel 23 is provided with inner and outer concentric cams 35 and 36, respectively, which, during rotation of the sprocket, engage alternately with the respective rollers 37 and 38 mounted in suitable brackets fixed upon the frame 10 to slide the wheel longitudinally upon the shaft 24 and either engage or disengage the toothed faces of the hub 34 and collar 32. If desired a spring 39 may be interposed between the hub 34 and the collar 32 to supplement the action of the cam 35, but it will be readily understood that this spring is not necessary to the operation of the machine. To provide for varying the length of time the toothed faces of the hub 34 and collar 31 shall remain in or out of engagement during a predetermined operation of another part of the machine and to thereby vary the amount of rotation of the feed rollers 26, the wheel 23 may be provided with the adjustable cam elements 40 and 41 which are provided with slots 42 and secured to the wheel by screws 43 passing through the slots. Thus by loosening the screws the cam elements may be adjusted to add or detract from the length of the cams 35 and 36, after which the screws may be tightened to maintain the cam elements in place. Thus, a longer or shorter period of engagement of either of the cams with its respective roller 37 or 38 will result in a variation in the amount of rotation of the shaft 24 and feed wheels 26 as will be obvious.

Spaced brackets 44 are secured to the frame 10 to support paper rolls 45 and 46. The paper from both the rolls is extended over the top of the supplementary top plate 30 and between the roller 27 and the feed wheels 26. Each intermittent partial rotation of the feed wheels therefore, will result in a portion of the paper of predetermined length being fed from each of the rolls while the interval between each partial rotation of the feed wheels will allow the paper to be at rest during the wrapping process of the machine. The roll of paper 46 is of less width than the roll 45 and is only intended to act as a liner between the article and the outer wrapping and, if desired, may be dispensed with entirely, but the roll 45 is of a width to allow sufficient paper for the outer or final wrapping of an article upon its sides, top, bottom and ends. This is best illustrated by the dotted lines in Fig. 2 of the drawings.

As the paper is fed from the rolls in predetermined lengths it is desirable that these lengths be severed to provide an individual wrapper for each article to be wrapped. The mechanism for severing the paper comprises a knife 47 pivoted at one end to a standard 48 secured to the supplementary top plate 30 near one side thereof. The top plate 30 is slotted transversely as at 49 to receive the knife upon its downward cutting stroke, while adjacent to this slot are arranged upper and lower plates 50 and 51 which act as guides for the paper as it passes from the feed rollers, the paper passing between these plates which are relatively spaced for the purpose. These guide plates are secured to the top plate 30 by screws 52 which pass through slots in the plates and allow for adjustment in the direction of the slot 49. The edge of the plate 51 nearest the slot 49 forms, in effect, the second element of a pair of shears the first element of which is constituted by the knife 47, the knife cooperating with the edge of the lower plate to sever the paper as it is progressively fed from the rolls.

The mechanism for actuating the knife consists of a bar 53 pivoted at one end to a standard 54 fixed to any convenient portion of the machine and at its other end is pivoted as at 55 to the lower end of a vertically arranged rod 56 which passes through guide openings in the top 13 and top plate 30 and is in turn pivoted at its upper end to the knife 47 near the pivotal connection of the knife with the standard 48. Intermediately the bar 53 carries a roller 57 which projects laterally from the bar and is received in the cam slot or channel 58 of a wheel 59 fixed on the shaft 21. The cam slot is formed in one face of the wheel 59 and throughout a major portion of its length extends concentric to the shaft 21, but at one point is directed inwardly as at 60. Normally the knife 47 is in a raised position out of the path of the paper and is so maintained by reason of the roller 57 riding in the concentric portion of the cam slot 58. Upon each revolution of the wheel 59, however, the inwardly directed portion 60 of the cam slot will cause the roller to be moved toward the axis of the shaft 21 and since the roller is fixed to the bar 53 the bar will be swung upon its pivot to exert a downward pull on the rod 56 to thereby actuate the knife 47 to shear the paper to form individual liners and wrappers for the articles to be wrapped both of which will be of a length as has been predetermined by adjustment of the cam elements 40 and 41 of the wheel 23. When sheared the central portion of the paper sheet or wrapper and liner will overlie an opening or well 61 in the supplementary top plate 30, being guided to such position by a second set of upper and lower guide plates upon the top plate 30 and lettered respectively 62 and 63, the former being of substantial U-shape and having its legs 64 arranged adjacent to opposite ends of the well 61.

Disposed so as to guide the articles to be wrapped toward the well 61 is a chute 65 having an endless conveyer 66 arranged therein to progressively and positively feed the articles forward as each successive article is subjected to the wrapping process. This conveyer is driven in any suitable manner, herein illustrated as by means of a sprocket 67, fixed on the shaft 21 and connected with a sprocket 68 fixed on an end of the conveyer roller shaft 69, by a chain 70. As the articles are fed forward the article nearest the end of the chute will be pushed clear therefrom and be deposited within a plunger box 71 which in its normal position is disposed above the several sheet or wrapper and in line with the well 61.

The box 71 is open upon one side to permit the article to be pushed thereinto and is bottomless, consisting merely of a top 72, two ends 73, and a single side or rear wall 74. Rising centrally from the top 72 is a standard or upright 75, bifurcated at its upper end to provide bearing arms 76 and having extending therefrom a lateral supporting arm 77 which is bent at right angles to itself and extended downward through guide openings in the supplementary top plate 30, and top 13 and through a bracket 78 fixed on one of the lowermost side rails 12, to form an actuating rod 79, the purpose of which is to reciprocate the box 71 vertically.

The mechanism for reciprocating the rod 79 consists of a lever 80 connected at one end to the rod 79 by a link 81 and at its other end fixed on a shaft 82 which also has fixed thereon the short lever 80'. This lever 80' has a pivotal connection 83 with one end of an actuating rod 84 the opposite end of which is slotted and slidably embraces the shaft 21. A roller 85 is carried by and projects laterally from the rod 84 into a cam slot 86 formed in one face of a wheel 87 which is fixed on the shaft 21, and which in all respects is similar to the wheel 59 hereinbefore described except for the shape of the cam slot 86 which in this instance extends concentric to the shaft 21 throughout substantially one-half of its length and then merges into an outward bulge 88, the purpose of which is to operate the rod 84 longitudinally upon each revolution of the wheel 87 to swing the lever 80 upon its pivot and thereby reciprocate the rod 79.

To opposite sides of the standard 75 are hinged at 89, 90 respectively, a pair of angle plates 91 and 92, each of which consists of a horizontal portion 93 and a vertical portion 94 terminating at its lower end in an inturned flange 95. Normally the portions 93 extend parallel to the top 72 of the box and the portions 94 embrace the ends 73 with the flanges 95 extending under and inward beyond the ends 73. Thin metallic plates 96 and 97 having slight inherent resiliency are secured respectively, to the horizontal portions 93 of the angle plates 91 and 92, said metallic plates extending outward and slightly downward beyond the vertical portions 94 of the angle plates and terminating in upturned ends 98. A shaft 99 connects the bearing arms 76 of the standard 75 and has loosely mounted thereon a pair of sheaves 100 and 101. Chains or other flexible connectors 102 and 103 are secured to the angle plates 91 and 92 and trained respectively over the sheaves 100 and 101 and at their free ends carry counterbalance weights 104 and 105. Secured to the guide plate 62 is the foot portion of an upright 106 which parallels the rear wall 74 of the box and at its upper end is turned inward over the box and extended laterally to provide a pair of arms 107 and 108 each of which is terminally bent at right angles to itself, as at 109, to overlie and vertically aline with the downwardly curved portion of the respective metallic plates 96 and 97.

By the provision of a plunger box as just described it will be observed that as an article A is pushed free of the chute 65 it will be deposited within the box 71 with its lower face at opposite ends supported on the inturned flanges 95 of the angle plates 91 and 92; that when the plunger box is moved downward through the well 61 the projecting ends of the yieldable metallic plates 96 and 97 will contact with the upper faces of the arms 64 of the U-shaped guide plate 62 and cause the angle plates to be swung outward on their hinges until the inturned flanges are withdrawn from beneath the article whereby the article will come to rest upon the top 13 of the frame; that having been swung outward the angle plates will be maintained in such position during the upward stroke of the plunger box through the instrumentality of the counter balance weights 104 and 105 until the extreme upward limit of movement of the box brings the curved portions of the plates 96 and 97 into contact with the portions 109 of the standard 106 which will operate to force the angle plates inward to their normal positions with the inturned flanges underlying the ends 73 in position to receive and support the next article as it is pushed into the box from the chute, and that due to the inherent resiliency of the plates 96 and 97 and the provision of the counterbalance weights 104 and 105 the angle plates will operate smoothly and positively from supporting to releasing position and vice versa during reciprocation of the plunger box.

The supplementary top plate 30 is reduced in thickness at 110 between the knife slot 49 and the well 61 and arranged for longitudinal sliding movement on this reduced portion is a slotted platform 111 which is of a length and width equal to or slightly greater than the length and width of the well 61 and of a thickness corresponding to the greatest thickness of the supplementary top plate 30, or of any thickness as may be governed by the construction of the machine which will insure of the space between the lower face of the sliding platform and the upper face of the top 13 corresponding in width to the space between the upper face of the top 13 and the lower face of the supplementary top 30. Augmenting the reduced portion 110 as a support for the sliding platform are guides 112 which are secured to the under face of the supplementary top plate at opposite ends of the well 61 and have inturned portions engaging the under face of the sliding platform near its ends. Normally the sliding platform is disposed to one side of the well 61 beneath the guide plates 62 and 63, its forward edge when in this position forming one side wall of the well as is best illustrated in Fig. 3 of the drawings. Extending downward from the sliding platform as fixed parts thereof are a pair of legs 113 which project through slots 114 in the top 13 and slightly below said top are pivotally connected with links 115 which in turn have pivoted connections with the upper ends of lever arms 116 fixed on a shaft 117 journaled in bearings 118 mounted on a plate 119 which is supported on a convenient portion of the frame of the machine such as certain of the longitudinal braces 12. A short lever arm 120, best illustrated in Fig. 7 is also mounted on the shaft 117 and has pivotally connected therewith one end of a horizontally arranged bar 121 which is slotted intermediately and slidably engaged with the shaft 21 and at its other end provided with a roller 122 which projects laterally into a cam slot 123 cut in one face of a wheel 124 which is fixed on the shaft 21. The cam slot 123 is oval in shape to cause the bar 121 to be reciprocated longitudinally during rotation of the shaft 21, such reciprocal movement of the bar 121 being transferred through the lever 120, shaft 117, arms 116, links 115 and legs 113 to the sliding platform 111 which moves from its normal position to a position beneath the plunger box 71 or over the article A deposited by the box on the upper face of the top 13.

Relatively spaced guides 125 are secured to the top 13 between the feed wheels 26, and longitudinally slidable in these guides is a plate 126, its forward end being bent up at 127 at right angles to itself and in its normal position underlying the sliding platform 111. L-shaped end flap folding elements 128 have one of their legs secured to the upturned end 127 of the plate 126 and their other legs relatively spaced and alined and terminally outwardly curved and shaped to perform certain folding functions which will become more readily apparent when the operation of the machine is described. Preferably the elements 128 are relatively adjustable for operation upon articles varying in length, such adjustment being permitted by slotting the first mentioned legs and passing fasteners such as screws through the slots and threading them into the upturned end 127.

An ear 129 projects upward from the plate 126 and has pivotally connected therewith one end of a link 130 the opposite end of which is pivotally connected to the upper end of an arm 131 fixed on a shaft 132 journaled in a bearing 133 on the plate 119. Also fixed on the shaft 132 is a short arm 134 which is pivoted to one end of a horizontally arranged bar 135 which is slotted intermediately and slidably engaged on the shaft 21. At its other end this bar carries a roller 136 which projects laterally into a cam slot 137 cut in one face of a wheel 138 which is fixed on the shaft 21. The cam slot 137 extends concentric to the shaft 21 throughout substantially one-half of its length and then merges into an outward bulge 139 so that as the wheel 138 rotates the bar 135 will be reciprocated and such reciprocal movement transferred through the arm 134, shaft 132, arm 131, link 130 and ear 129 to the plate 126 and through the plate to the folding elements 128.

Located on the top 13 beneath the chute 65 and longitudinally alined with the end flap folding mechanism just described is a guide-way 140 which is of inverted U-shape in cross section and of a size to snugly receive the articles after they are wrapped. The two sides of this guide-way, adjacent its end nearest the well 61, are cut away and have associated therewith elements 141 to form upper and lower longitudinal slots 142 and 143 the latter of which is of greater length than the former which terminates in a downwardly curved portion 144 opening into the lower slot 143. The lower slot continues longitudinally a short distance and terminates in an upward curve 145. By the provison of such a structure it will be observed that the elements 141 are entirely separated from the side walls of the guideway and in order to maintain the elements 141 in proper relation to the side walls of the guide-way brackets 146 are provided, said brackets being of U-shape and having their out-turned feet secured, respectively to the side walls of the guide-way and the elements 141, the U portion of the brackets being arranged adjacent to the curved portion 144 of the slots to permit a free passage of any portion of the wrapper which might protrude therethrough during passage of the article through the guide-way. Forwardly the elements 141 terminate in fins 147 which are disposed in alinement with and similarly shaped to the end flap folding elements 128.

Secured to the under face of the supplementary top plate 30 and projecting into the guide-way 140 is a thin spring plate 148.

The operation of the machine is as follows: The machine being set in motion and the paper from the rolls 45 and 46 being trained over the top of plate 30 and between the roller 27 and the feed wheels 26, as the cam on the outerface of the sprocket wheel 23 engages with the roller 38 the ratchet teeth 33 of the sprocket will be forced into mesh with the teeth 32′ of the collar 32, causing the shaft 24 and feed wheels 26 to be rotated until the cam on the inner face of the sprocket wheel engages the roller 37 and disengages the teeth 33 and 32′. The feed wheels during their partial rotation will coöperate with the roller 27 to frictionally advance the paper a distance predetermined by adjustment of the cam elements 40 and 41.

Immediately following the disengagement of the ratchet teeth 32' and 33 the cam wheel 59 comes into play to actuate the knife 47 to shear the paper and provide a wrapper B.

The plunger box 71 being normally up and idle the article to be wrapped may be deposited therein at any time while it is in such position. An article being in the box the cam wheel 87 next operates to lower the box through the well 61, opposite sides thereof engaging the wrapper B and causing the wrapper to be folded up upon the two sides of the box. When the box reaches its lowermost position the inturned flanges will be disengaged from their supporting position and the article deposited on the top 13, the box, then rising to its normal position and leaving the article in its deposited position with the wrapper extending under the bottom and up upon two sides thereof as illustrated in Fig. 11.

As the box 71 reaches its normal position the cam wheel 124 comes into play to advance the sliding platform 111, the forward edge and lower face of which successively engage with the near upwardly extending portion of the wrapper to fold the same down upon the top of the article as illustrated in Fig. 12, the sliding platform passing over the top of the article, as will be understood.

When the sliding platform has partially completed its forward movement the cam wheel 138 operates to advance the plate 126, and with the plate the end flap folding elements 128, said elements 128 engaging with the paper to either end of the article to make the initial end flap folds as illustrated in Fig. 12. Continuing its advance the yoke defined by the elements 128 and upturned end of the plate 126 pushes the article forward until it is clear of the well 61. During this forward movement of the article the upstanding portion of the wrapper to the far side of the article is engaged successively by the edge of the plate 30, forming the rear side wall of the well 61, and its under surface to fold the second top flap of the wrapper down upon the first flap, as illustrated in Fig. 13. Simultaneously with this folding action the fins 147 engage with the wrapper to either end of the article to complete the two initial end folds as illustrated in Fig. 14.

When the foregoing operations have been completed the machine has already begun its next cycle of operation and as soon as the sliding platform and yoke have receded the plunger box is again lowered and the operations repeated.

As the articles are successively pushed forward by the sliding yoke the upper and lower projecting ends of the wrapper at either end of the article engage in and pass through the longitudinal slots 142 and 143 of the guide-way 140. During this advance the upper projecting ends of the wrapper are folded downward against the article by reason of the curved portion 144 of slot 142 while the lower projecting ends are folded upward against the ends of the article and in overlapping relation to the upper ends by reason of the upward curve 145 of the slot 143, thus completing the wrapping operation, the plate 148 coöperating with the walls of the guide-way to maintain the wrappers in neat engagement with the articles, the articles leaving the guide-way in wrapped condition to be packed for shipping or offered to the trade.

It is to be noted that my present invention is particularly adapted for wrapping soft articles, such as cakes and the like, which are liable to be crushed and broken while being wrapped in machines in which a plunger directly engages the cake or other article to force it in a direction to cause the wrapper to be folded therearound, the present machine providing a construction which entirely eliminates this disadvantage by reason of the fact that no force whatever is exerted upon the article to cause the wrapper to be folded therearound, such force being borne by metallic portions of the machine.

To those skilled in the art to which this invention appertains many minor changes and modifications in the machine I have disclosed will no doubt present themselves. Contemplating this fact I desire to restrict myself only to such limitations as the claims may impart.

I claim:

1. In an automatic machine for wrapping articles, wrapping material feed mechanism, article feed mechanism, a reciprocating box for transferring the articles from the article feed mechanism and depositing them in a position to be wrapped, angle plates hinged to the box, a portion of each of said plates underlying said box for supporting an article therein, plates carried by the angle plates and adapted to engage a portion of the machine for swinging the angle plates to a releasing position from under the box when the box reaches its limit of movement in one direction, means for engagement with said last named plates to return the angle plates to normal position when the box reaches its limit of movement in the other direction, and means for wrapping the material about the deposited articles.

2. In an automatic machine for wrapping articles, a frame including a top, a supplementary top spaced above said first top and having a well therein, means for feeding the wrapping material over said well, a plunger box normally disposed above said supplementary top and in line with said well, means for feeding the articles to said box, means for reciprocating the box from its normal position through said well and back to its normal position, angle plates hinged to said box and having flanges for supporting an article therein, inherently resilient plates fixed on said angle plates and adapted to engage a portion of said supplementary top to cause the angle plates to be swung to release the flanges from article supporting position upon completion of the movement of the box in one direction, counterbalance weights to maintain the angle plates in released position during movement of the box in the other direction, arms for engagement with said resilient plates to return the angle plates to normal position when the box reaches its normal position, and means for wrapping the released articles.

3. In a machine of the character described, a reciprocating article transfer box, a member pivoted to said box for supporting an article therein, said member including an element engageable with a fixed portion of the machine when the box approaches its limit of movement in one direction to releasably move said member from article supporting position, and means to return the member to article supporting position as the box moves in an opposite direction.

4. In a machine of the character described, a reciprocating article transfer device, a member carried by said device for supporting an article in predetermined relation thereto, and means carried by said member operable by contact with a fixed portion of the machine during reciprocation of the device to effect movement of the member to release an article supported thereby.

5. In a machine of the character described, a reciprocating article transfer box, members carried by the box for releasably supporting an article therein, and inherently resilient plates fixed to said members, said plates being operable by contact with a fixed portion of the machine during reciprocation of the box to effect movement of the members to release an article supported thereby.

6. In a machine of the character described, a reciprocating article transfer box, members carried by the box for releasably supporting an article therein, inherently resilient plates fixed to said members, said plates being operable by contact with a fixed portion of the machine during reciprocation of the box to effect movement of the members to release an article supported thereby, and means to maintain the members in released position during a predetermined reciprocal movement of the box.

7. In a machine of the character described, a reciprocating article transfer box, members carried by the box for releasably supporting an article therein, inherently resilient plates fixed to said members, said plates being operable by contact with a fixed portion of the machine during reciprocation of the box to effect movement of the members to release an article supported thereby, means to maintain the members in released position during a predetermined reciprocal movement of the box, and positively acting means to return the members to article supporting relation with the box as the box approaches its limit of reciprocal movement in one direction.

In testimony whereof I affix my signature in the presence of two witnesses.

CARL O. WACHTER.

Witnesses:
S. G. CROW,
FRED H. BRINKMAN.